Figure 1:
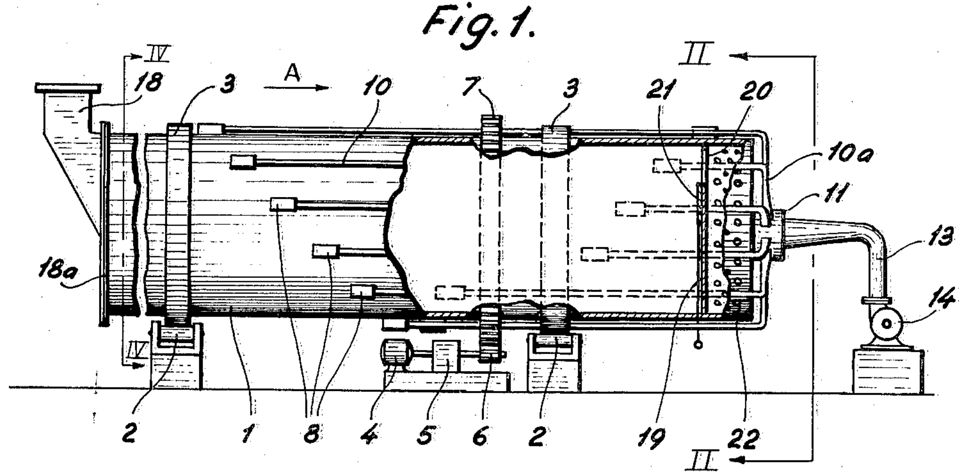

Sept. 25, 1962 K. F. PETERSEN 3,055,744

APPARATUS FOR THE FERMENTATION OF SOLID ORGANIC WASTE MATERIALS FOR MAKING COMPOST

Filed Oct. 28, 1959 2 Sheets-Sheet 1

Sept. 25, 1962 K. F. PETERSEN 3,055,744

APPARATUS FOR THE FERMENTATION OF SOLID ORGANIC WASTE MATERIALS FOR MAKING COMPOST

Filed Oct. 28, 1959 2 Sheets-Sheet 2

3,055,744

APPARATUS FOR THE FERMENTATION OF SOLID ORGANIC WASTE MATERIALS FOR MAKING COMPOST

Kai Finn Petersen, Rungsted, Denmark, assignor to Dano Ingeniorforretning og Maskinfabrik Ingenior Kai Petersen's Fond, Buddinge per Soborg, Denmark, a Danish body corporate Filed Oct. 28, 1959, Ser. No. 849,396
Claims priority, application Denmark Nov. 1, 1958
2 Claims. (Cl. 23—259.1)

For the fermentation of solid organic waste materials for making compost it is known to use an apparatus comprising an elongated horizontally disposed rotatable container, at the shell of which there are provided apertures or nozzles, which are open to the interior of the container, said apertures or nozzles being distributed in the longitudinal direction of the shell and being in connection with an outside source of aeration medium under positive pressure.

The apparatus operates in the way that the waste materials to be treated are filled into the container at one end thereof and advanced through said container in the longitudinal direction thereof during rotation of the container about its substantially horizontal axis, whereby the materials contained in the container are turned over and over. During its passage through the container, the waste material will be fermented, and the treated material will be removed from the opposite end of the container. The aeration medium necessary for the purpose of the treatment is supplied to the contents from the container shell, i.e. in a transverse direction from without and inwardly, whereby the contents will act as a valve for the escape of air. In the said type of apparatus this phenomenon has been utilized to regulate the temperature, which arises in the mass of material during the fermentation of the waste materials, the supply of aeration medium being restricted in places where a high temperature is desired, whereas in places where it is desired to keep the temperature down, the supply of aeration medium is increased. Furthermore, good results have been obtained in practice by supplying only a small quantity of aeration medium to the end of the container, where the waste materials are fed into the container, so as to achieve a rapid heating of the contents to the desired working temperature of fermentation, whereas a comparatively large quantity of aeration medium has been supplied to the container at its opposite end, so as to cool and dry the fermented products. In the zone provided between these two zones, the so-called fermentation zone, it has been the aim by regulation of the supply of aeration medium, and if necessary, differentiation of the supply of aeration medium along the length of said zone to keep the contents at an optimal working temperature e.g. of 35–50° C. throughout the length of said zone.

In known apparatuses of the kind indicated heretofore, the apertures or nozzles are disposed spaced from one another in rows along the container shell, preferably in two or three rows. Each row is defined by a single duct for the supply of the aeration medium which substantially extends over the total length of the shell and is connected at one end to a blower, the apertures or nozzles in one row communicating altogether with said single duct. The containers of these apparatuses are comparatively large and are normally built with a diameter of 2 meters and more. Seeing that normally the apparatuses work at a high degree of filling, as a rule about 80%, the column of material above the apertures or nozzles which are in lowermost position during the rotation of the container will be high and heavy. On the other hand, aeration medium supplied from these said apertures or nozzles will precisely have the best possible prospects of penetrating into a maximum part of the contents. In order to surmount the resistance of the column of material, it will be necessary to blow the air into the container at a substantial positive pressure. Seeing that all apertures or nozzles of one row emanate from a common duct, the air, however, will try to escape through those apertures or nozzles, where the resistance of the column of material is weakest, and the consequence of this is that most often the desired air supply to the parts of the contents, which it is desired to have effectively aerated, is not achieved. Experience has thus proven, that it may be difficult to obtain the desired powerful aeration in the said drying zone.

The object of the invention is to indicate an apparatus of the said kind, wherein the supply of aeration medium from all apertures or nozzles can be safely provided and maintained to the desired extent.

According to the invention this object is obtained by connecting the apertures or nozzles or groups of apertures or nozzles distributed longitudinally of the shell each with supply means for aeration medium under positive pressure, one supply means per aperture or nozzle or per group of apertures or nozzles. By such a construction it will be possible to provide an aperture or a nozzle or a group of apertures or nozzles with exactly the quantity of medium and exactly the pressure of medium, which is desired at the place concerned, independently of the other apertures or nozzles.

It is a further object of the invention to indicate an advantageous distribution of said apertures or nozzles or groups of apertures or nozzles along the container shell. According to the invention a suitable distribution of the apertures or nozzles on the container shell can be provided by disposing the apertures or nozzles or the groups of apertures or nozzles on a helix, which extends around the shell at a coarse pitch. Thus distributed, the apertures or nozzles can be connected without constructional difficulties with their separate supply means of aeration medium supply.

It is a still further object of the invention to indicate an advantageous arrangement of the aeration medium supply means at the container. Thus, in an embodiment of the apparatus, where the waste materials are fed into the container at one of its ends, it may be expedient according to the invention that each of the apertures or nozzles or of the groups of apertures or nozzles is connected with a separate air duct, which extends longitudinally of the container shell to the opposite end of the container, where the ducts are connected with a common conduit for the supply of aeration medium. Such a constructional form is simple, and the feeding of waste material at one end of the container will not be disturbed by devices for the supply of aeration medium.

Figure 2:
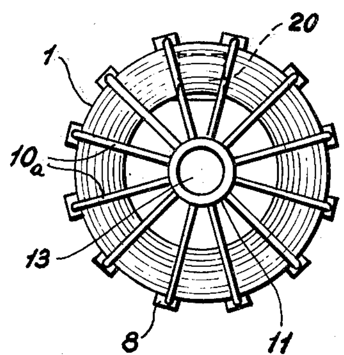
Figure 3:
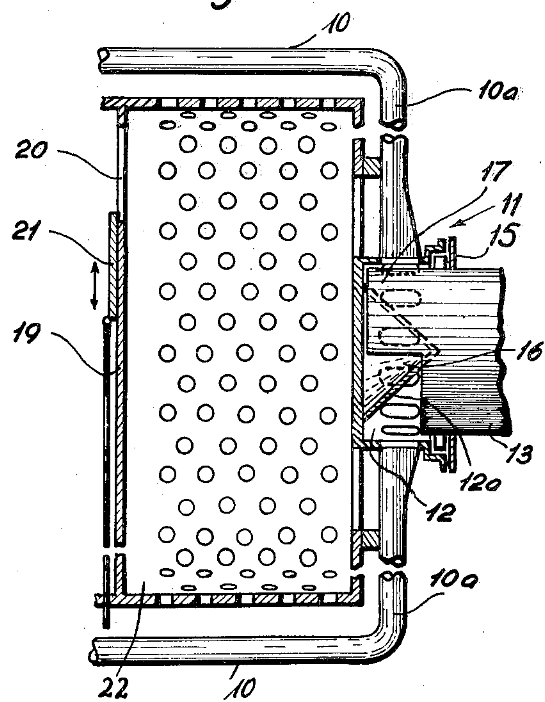
Figure 4:
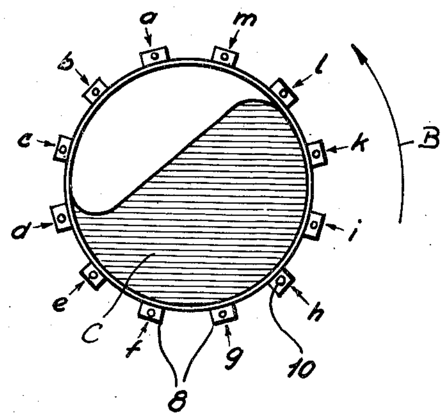
Figure 5:
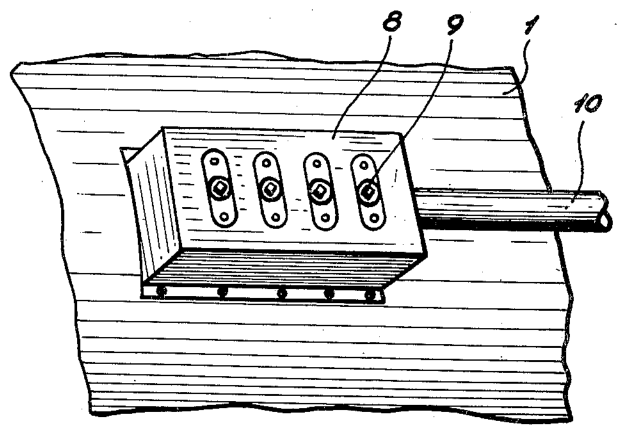

One embodiment of an apparatus according to the invention will be described hereinafter in more detail, reference being had to the drawing, wherein:

FIGURE 1 shows part of the apparatus, as seen partly from the side and partly in section, FIGURE 2 shows the apparatus as seen from the end on the line II—II, FIGURE 3 is a longitudinal section through a right-hand end part of the apparatus according to FIGURE 1, on a larger scale, FIGURE 4 is a section on the line IV—IV in FIGURE 1, and FIGURE 5 is a detail of the apparatus showing a valve box, on a larger scale.

The apparatus according to the invention comprises a cylindrical, elongated, horizontally disposed container 1 which is rotatably supported by means of bearings 2 co-operating with bearing rails 3 mounted on the periphery wall or shell of the container and surrounding said wall.

The container is rotatable by means of an electromotor 4 which is positively connected with a control gear 5 having a gear wheel 6 which meshes with a gear ring 7 connected to the container 1 and extending about the periphery wall thereof.

On the peripheral wall of the container 1, a number of valve boxes 8 is mounted. Each valve box contains a suitable number of valves disposed in the periphery wall of the container 1 and open to the interior thereof. An embodiment of a valve box is diagrammatically shown in FIGURE 5.

In the embodiment shown each valve box 8 contains a group of valves as indicated by 9, in the present embodiment four valves, the valve being of suitable construction. The said valves are in a known way individually adjustable. If wanted, a minor or larger number of valves per box may be chosen, and the invention is not limited to a predetermined number of valves per box. The valve boxes may also communicate with the interior of the container through simple apertures only, and said apertures may be adapted to be opened or closed by a slide member. Such features, however, are well known to those skilled in the art and therefore, they are not shown in detail. Instead of a group of valves or apertures, a box 8 may also have a single injection valve or aperture, only. Whatever such single valve or aperture or groups thereof shall be used, they will be defined as injection means in the claims.

Each valve box communicates with a pipe 10, each pipe connecting its valve box with a source of aeration medium under pressure, as will be described in the following. The pipes 10 are disposed on the outside of the periphery wall of the container and extend towards the right-hand end of the embodiment as shown in FIGURE 1.

At this end of the container, the pipes 10 are connected with a common aeration medium distribution box 11, vide FIGURE 3.

The distribution box 11 has a jacket 12 and a bottom member **12*a* shaped as a cone protruding into said jacket 12 and serving as a distribution member for aeration medium fed into said box, as will be described in the following. It appears from the drawing that said distribution box 11 is substantially formed as a pot disposed on edge. The pipes 10 are connected with the jacket 12 by means of pipe portions 10*a* extending radially from the pipes 10 across the right-hand end of said container. The pipe portions 10*a* communicate with the interior of the distribution box 11. The jacket 12 is rotatable together with the said pipes and the container 1**.

By means of a conduit 13, a blower 14 for aeration medium is connected with said distribution box, the discharge end of said conduit extending into said box with an end portion substantially coaxial with the said box, vide FIGURE 3. At this end, the conduit is provided with a shoulder or ring 15 forming a lid for the distribution box and tightening the interior of said box towards the atmosphere. The conduit 13 is stationary.

As shown in FIGURE 3, a lower end portion of that part of the conduit 13 extending into the distribution box 11 is removed thus forming an axial recess 16 from the very discharge end of the conduit 13, while the corresponding uppermost end portion 17 of the conduit 13 has been maintained, this portion 17 forming a sort of screen plate within the jacket 12. This screen plate constitutes a closing device for cutting of supply of aeration medium to those pipes 10, **10*a* emanating from a portion of the jacket 12 being an upper one during the rotation thereof, so that aeration medium may only be supplied to those pipes 10, 10*a* extending from a portion of the jacket 12 being a lower one during rotation thereof. In other words, during the rotation of the container 1**, aeration medium will only be supplied to those valves or apertures disposed at a lower portion of the periphery wall of the container during rotation thereof.

The valve boxes 8 are disposed on the peripheral wall of the container along a helix extending at coarse pitch about the periphery wall of the container. Due to this arrangement valve boxes having different axial distance from the feeding end or the discharge end of the container will be alternatingly provided with aeration medium.

During operation of the apparatus, waste material to be treated will be filled into the container 1 through a hopper 18 disposed at the left-hand end of the embodiment as shown in FIGURE 1 in a stationary end wall **18*a* of the container. The container will be rotated e.g. in the direction of an arrow B as indicated in FIGURE 4, and the contents C of the container will then be tumbled and mixed and occupy substantially a general position as indicated in FIGURE 4. Simultaneously, the contents C will gradually pass through the container 1 in axial direction thereof as indicated by an arrow A in FIGURE 1. In the present example, the degree of filling of the container with waste material is supposed to be about 80%. By means of the distribution box 11, aeration medium supplied by the blower 14 will only be forced through those valves or apertures in the boxes 8 which at any time are situated at a lower portion of the container. In the embodiment shown the arrangement is thus that the boxes 8** positioned at *a, b, c, d, l* and *m* in FIGURE 4 will be cut off from aeration medium supply while the boxes 8 positioned at *e, f, g, h, i, k* will be supplied with aeration medium. Thereby, the aeration medium supplied will be compelled to pass through the contents C. Each valve box 8 is individually provided with aeration medium through a separate pipe 10, **10*a*. Therefore, it will be understood that a construction in which each valve box 8 is provided with a blower for aeration medium must be regarded as being equivalent to the embodiment shown. It will be further understood, that because of said individual supply of aeration medium, it will be possible to supply aeration medium at the desired positive pressure to all valve boxes. Instead, by means of individually adjustable valves within each box 8, the blowing of air from the individual valve boxes 8 into the container 1 may also be controlled by means of adjustable valves which are disposed in the pipes 10, 10*a***. By means of individual control of aeration medium supply to the interior of the container through said valves or apertures referred to, the supply of aeration medium to the contents C may be positively differentiated along the length of the container, and thus, optimal conditions of treatment of the contents may be obtained and maintained.

When travelling through the container 1, the waste material can undergo fermentation and be cooled and dried, and the fermented products can be removed from the container at the right-hand discharge end thereof. At this end, the container 1 may be provided with a partition wall 19 having an opening 20 which may be closed or opened by means of a sliding door 21. To the right-hand side of said partition, the peripheral wall of the container 1 may be extended by a peripheral wall portion 22 being perforated and thus serving as a screen for treated material leaving the container 1 through the door 19, see also FIGURE 3.

In the embodiment shown in FIGURES 1 and 3 the pipes 10, **10*a* extend across the wall portion 22**.

Escape of gaseous medium from the interior of the container may occur through the hopper 18 and/or the door 20.

Having now fully described my invention I claim as new and desire to secure by Letters Patent:

1. Apparatus for making compost from uncomminuted non-fluid waste materials containing fermentable organic substances, which comprises, a solid-walled, elongated container, means for mounting said container for rotation about a substantially horizontal axis, means for feeding uncomminuted waste material into said container at one end thereof, discharge means at the opposite end of said container for discharging treated material from said container at the opposite end thereof from said feeding end, means for injecting aeration medium into said container, said injection means being arranged at the peripheral wall of said container and said injection means being distributed at spaced intervals along said wall in the axial direction of said container, aeration medium supply means arranged on said container wall, one supply means per injection means and communicating means between said supply means and said injection means for putting said supply means in communication with said aeration medium injection means, said communicating means including variable means for variably controlling the admission of aeration medium into said container through said injection means along the length of the container and means at a position of said supply means remote from said communicating means for introducing aeration medium under pressure into said supply means.

2. Apparatus for making compost from uncomminuted non-fluid waste materials containing fermentable organic substances, which comprises a solid-walled, elongated container, means for mounting said container for rotation about a substantially horizontal axis, means for feeding uncomminuted waste material into said container at one end thereof, discharge means at the opposite end of said container for discharging treated material from said container at the opposite end thereof from said feeding end, means for injecting aeration medium into said container, said injection means being arranged at the peripheral wall of said container on a helix which extends around the container wall with substantial inclination, and said injection means being distributed at spaced intervals along said wall in the axial direction of said container, duct means arranged on said container wall, one duct means per injection means, and communicating means for putting said duct means in communication with said aeration medium injection means, said communicating means including aeration medium admission control means operably connected with said aeration medium injection means and between said aeration medium injection means and the discharge end of said duct means for variably controlling the admission of aeration medium into said container through said injection means along the length of said container, the said duct means extending from said injection means towards the discharge end of said container and said duct means further communicating with a source of aeration medium under pressure arranged at said discharge end of said container.

References Cited in the file of this patent

UNITED STATES PATENTS

| | | |
|---|---|---|
| 1,424,335 | Bodman | Aug. 1, 1922 |
| 1,823,813 | Wurster | Sept. 15, 1931 |
| 2,641,280 | Fleischhauer | June 9, 1953 |